(12) United States Patent
Kim et al.

(10) Patent No.: US 8,105,501 B2
(45) Date of Patent: Jan. 31, 2012

(54) UV CURABLE LIQUID PRE-POLYMER, AND LIQUID CRYSTAL DISPLAY DEVICE USING THE SAME AND MANUFACTURING METHOD THEREOF

(75) Inventors: Jin Wuk Kim, Gyeonggi-do (KR); Tae Joon Song, Gyeonggi-do (KR); Yeon Heui Nam, Gangwon-Do (KR); Seong Pil Cho, Seoul (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 12/948,482

(22) Filed: Nov. 17, 2010

(65) Prior Publication Data

US 2011/0062395 A1    Mar. 17, 2011

Related U.S. Application Data

(62) Division of application No. 11/978,816, filed on Oct. 30, 2007, now Pat. No. 7,854,858.

(30) Foreign Application Priority Data

Dec. 29, 2006  (KR) .............................. P2006-138219
Aug. 31, 2007  (KR) .............................. P2007-088263

(51) Int. Cl.
*C09K 19/00* (2006.01)
*C09K 19/06* (2006.01)
*C09K 19/32* (2006.01)
*C09K 19/52* (2006.01)

(52) U.S. Cl. ................... 252/299.01; 252/582; 252/586; 252/588; 430/20

(58) Field of Classification Search .................. 252/582, 252/586, 588, 299.01; 430/20
See application file for complete search history.

(56) References Cited

U.S. PATENT DOCUMENTS

| 6,503,564 B1 * | 1/2003 | Fleming et al. ............ 427/255.6 |
| 7,501,163 B2 | 3/2009 | Kim |
| 7,838,196 B2 * | 11/2010 | Nam et al. ................. 430/270.1 |
| 2006/0097414 A1 | 5/2006 | Chae et al. |

FOREIGN PATENT DOCUMENTS

| JP | 03-079674 | 4/1991 |
| TW | 200615585 | 5/2006 |

OTHER PUBLICATIONS

Office Action issued in corresponding Taiwan Patent Application No. 096143550, issued Oct. 28, 2011.

* cited by examiner

*Primary Examiner* — Geraldina Visconti
(74) *Attorney, Agent, or Firm* — Brinks Hofer Gilson & Lione

(57) ABSTRACT

A liquid-crystal display includes a first substrate and a second substrate disposed opposite the first substrate, and a plurality of pixel areas formed on the first substrate, where each pixel area has red, green, blue, and white sub-pixel areas. Red, green and blue color filter layers are disposed on the red, green and blue sub-pixel areas, respectively, and an overcoat layer is disposed over the red, green and blue color filter layers, where a portion of the overcoat layer forms a white color filter layer in the white sub-pixel area. The overcoat layer is formed from a UV-curable liquid pre-polymer material, which includes monomers each having a mono-functional group, and at least a di-functional group or a tri-functional group.

9 Claims, 6 Drawing Sheets

UV CURABLE LIQUID PRE-POLYMER, AND LIQUID CRYSTAL DISPLAY DEVICE USING THE SAME AND MANUFACTURING METHOD THEREOF

The present patent document is a divisional of U.S. patent application Ser. No. 11/978,816, filed Oct. 30, 2007 now U.S. Pat. No. 7,854,858, which claims priority to Korean Patent Application No. P2006-138219 filed in Korea on Dec. 29, 2006 and Korean Patent Application No. P2007-088263 filed in Korea on Aug. 31, 2007, which are hereby incorporated by reference.

BACKGROUND

1. Field of the Invention

The present invention relates to a non-exposure process, and more particularly, to a UV curable liquid pre-polymer to improve a thermal stability by changing ingredients of an overcoat layer or by changing ingredients of a column spacer in addition to the overcoat layer. The present invention also relates to a liquid crystal display (LCD) device using the UV curable liquid pre-polymer and a method of manufacturing the LCD device.

2. Discussion of the Related Art

A minute pattern process used in an electric circuit is an important factor that affects the device properties and capacity. Non-exposure processes have become more important in recent years.

One non-exposure process, namely, In-Plane Printing, uses a UV curable liquid pre-polymer as a pattern material. However, the UV curable liquid pre-polymer is weak once heat-treated, where the UV curable liquid pre-polymer shrinks or contracts. When using an In-Plane Printing process using a soft mold to form an overcoat layer and a column spacer as one body, or to form a white color filter layer with an overcoat layer and the column spacer together in a white plus structure, the column spacer, the overcoat layer or the white color filter layer may shrink due to the heat treatment. This may occur, for example, during the baking process after forming an alignment layer on the column spacer.

A related art UV curable liquid pre-polymer and a method of manufacturing an LCD device will be described with reference to the accompanying drawings. FIG. 1 shows a pictorial drawing of a quad-type single pixel including a white sub-pixel. An LCD device patterned by a UV curable liquid pre-polymer includes first and second substrates facing each other and a liquid crystal layer formed between the first and second substrates. Each of the first and second substrates includes a plurality of pixel regions, wherein each pixel includes red (R), green (G), blue (B) and white (W) sub-pixels, as shown in FIG. 1. Also, red (R), green (G), blue (B) and white (W) color filter layers 12a, 12b, 12c and 14 are respectively formed in the red (R), green (G), blue (B) and white (W) sub-pixels.

This structure having the white (W) sub-pixel in addition to the red (R), green (G) and blue (B) sub-pixels is referred to as a "white plus structure." In FIG. 1, a quad-type one pixel is divided into four portions, wherein the red (R), green (G), blue (B) and white (W) sub-pixels are respectively positioned in the four portions of the quad-type single pixel, which shows the white plus structure. The red (R), green (G), blue (B) and white (W) sub-pixels may be arranged in the shape of a stripe, and the corresponding color filter layers may be respectively formed in the sub-pixels.

FIGS. 2A to 2C show cross sectional views illustrating a method of manufacturing a color filter array substrate in a quad-type pixel structure. FIG. 3 shows a cross sectional view of illustrating shrinkage or contraction in a color filter array after baking the alignment layer.

Referring to FIG. 2A, a light-shielding layer 11 is formed in the boundaries of sub-pixels on a first substrate 10 defined by a plurality of pixels, where each pixel includes red (R), green (G), blue (B) and white (W) sub-pixels. The light-shielding layer 11 is formed in the boundaries of sub-pixels on the first substrate 10, which corresponds to a gate line, a data line and a thin film transistor formed on a second substrate (not shown). A red color filter layer 12a, a green color filter layer (see FIG. 1, 12b) and a blue color filter layer (see FIG. 1, 12c) are respectively formed in the red (R), green (G) and blue (B) sub-pixels of first substrate 10.

A pattern material layer 13 of UV curable liquid pre-polymer is then coated on an entire surface of first substrate 10, including the light-shielding layer 11 and the red (R), green (G) and blue (B) color filter layers 12a, 12b and 12c. The pattern material layer 13 of UV curable liquid pre-polymer is cured by UV light, which pre-polymer is more viscous than a general polymer, and is changed by pressure.

As shown in FIG. 2B, a mold 20 having a backplane (not shown) formed on the rear surface thereof is brought into contact with the pattern material layer 13 to form a pattern 130 in the pattern material layer 13 corresponding to concave and convex portions of the mold 20. Referring to FIG. 2C, the mold 20 is separated from the pattern 130. As a result, the pattern 130 is formed of a white color filter layer 14 provided in the white sub-pixel, an overcoat layer 15 provided on the entire surface of first substrate 10 (including the light-shielding layer 11 and the red, green, blue and white color filter layers 12a, 12b and 12c), and a column spacer 16 provided on the overcoat layer 15 above the light-shielding layer 11. After completing the above-mentioned steps, the white color filter layer 14, the overcoat layer 15 and the column spacer 16 are integrally formed as one body and constitute the pattern 130.

FIGS. 2A to 2C show the white sub pixel and its layers, wherein the white color filter layer is formed during the process of forming the overcoat layer and the column spacer rather than forming the white color filter layer as an additional color filter process step. With respect to the column spacer 16, the overcoat layer 15 and the white color filter layer 14 are patterned together by one pattern material layer. When forming an alignment layer 18 of polyimide on the surface of pattern 130, the alignment layer is baked by a heat treatment of about 180 degrees Centigrade. In this case, the overcoat layer becomes uneven due to the shrinkage or contraction of UV curable liquid pre-polymer. It is necessary for the white sub pixel to properly maintain both the thickness 14a of white color filter layer and the thickness of overcoat layer 15a. Thus, the pattern surface 130a of white sub pixel is more recessed or shrunken than the other portions by the contraction or shrinkage of UV curable liquid pre-polymer during the process of baking the alignment layer 18.

BRIEF SUMMARY

A liquid-crystal display includes a first substrate and second substrate disposed opposite the first substrate, and a plurality of pixel areas formed on the first substrate, where each pixel area has red, green, blue, and white sub-pixel areas. Red, green and blue color filter layers are disposed on the red, green and blue sub-pixel areas, respectively. An overcoat layer is disposed over the red, green and blue color filter layers, where a portion of the overcoat layer forms a white color filter layer in the white sub-pixel area. The overcoat layer is formed from a UV-curable liquid pre-polymer material that includes monomers each having a mono-functional group, and at least one of a di-functional group and a tri-functional group.

It is to be understood that both the foregoing general description and the following detailed description of the present invention are exemplary and explanatory, and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) and together with the description, serve to explain the principles of the invention.

DETAILED DESCRIPTION OF THE DRAWINGS AND THE PRESENTLY PREFERRED EMBODIMENTS

Reference will now be made in detail to exemplary embodiments, which are illustrated in the accompanying drawings. Wherever possible, the same reference numbers will be used throughout the drawings to refer to the same or like parts. A UV curable liquid pre-polymer, an LCD device using the UV curable liquid pre-polymer as a patterning material, and a manufacturing method thereof will be described with reference to the accompanying drawings.

The UV curable liquid pre-polymer allows minimization of shrinkage of certain material during thermal processing by changing or substituting certain ingredients. The curing and thermal properties based on the number of functional groups in the UV curable liquid pre-polymer will now be described. The functional group corresponds to a site where a monomer compound chemically reacts with a polymer. For example, a mono-functional group has one site where the monomer compound reacts with the polymer. That is, a di-functional group or tri-functional group has two or three sites where the monomer compound reacts with the polymer.

Figure 4A:
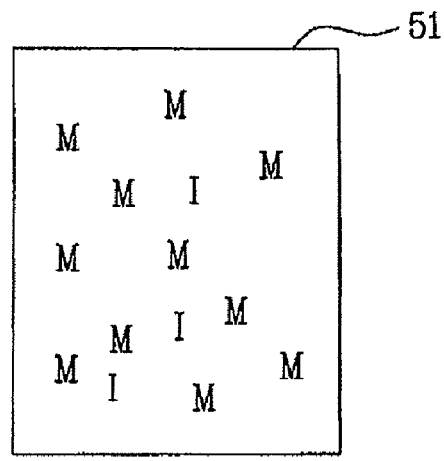
FIGS. 4A to 4C show a volume change in a UV curable liquid pre-polymer including a mono-functional group after a curing process and a heat treatment.
Figure 4B:
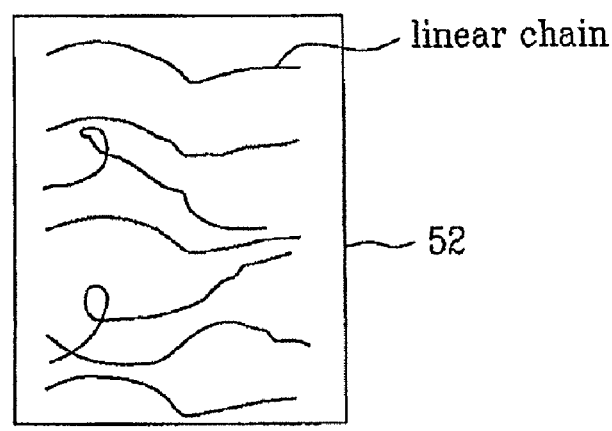
Figure 4C:
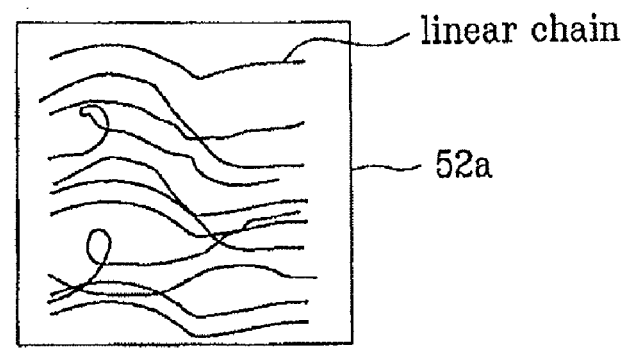

FIGS. 4A to 4C show the volume change in the UV curable liquid pre-polymer including the mono-functional group after the curing process and the heat treatment. For example, the UV curable liquid pre-polymer 51 is formed on a substrate (not shown), wherein the UV curable liquid pre-polymer 51 includes monomers (M) each having a mono-functional group, and mono-functional initiators (I) each having an active site of mono-functional group as an initiator to induce an initial reaction on the monomers (M).

As the UV curable liquid pre-polymer is activated by UV radiation, each monomer including the mono-functional group has one active site. After curing a pattern layer 52 by UV radiation, as shown in FIG. 4B, a thin film of UV curable liquid pre-polymer is formed as a linear chain structure. Because the monomer (M) having the mono-functional group is activated by the mono-functional initiator (I), each site activated is combined with another monomer, and such combination repeatedly occurs on a horizontal plane, thereby forming the linear chain structure. After the curing process, the linear chain structures are piled or stacked at fixed intervals, wherein each linear chain structure is horizontal. The linear chain structures are arranged horizontally after the curing process, and the thin film of UV curable liquid pre-polymer is cured and formed as the pattern layer 52.

Figure 1:
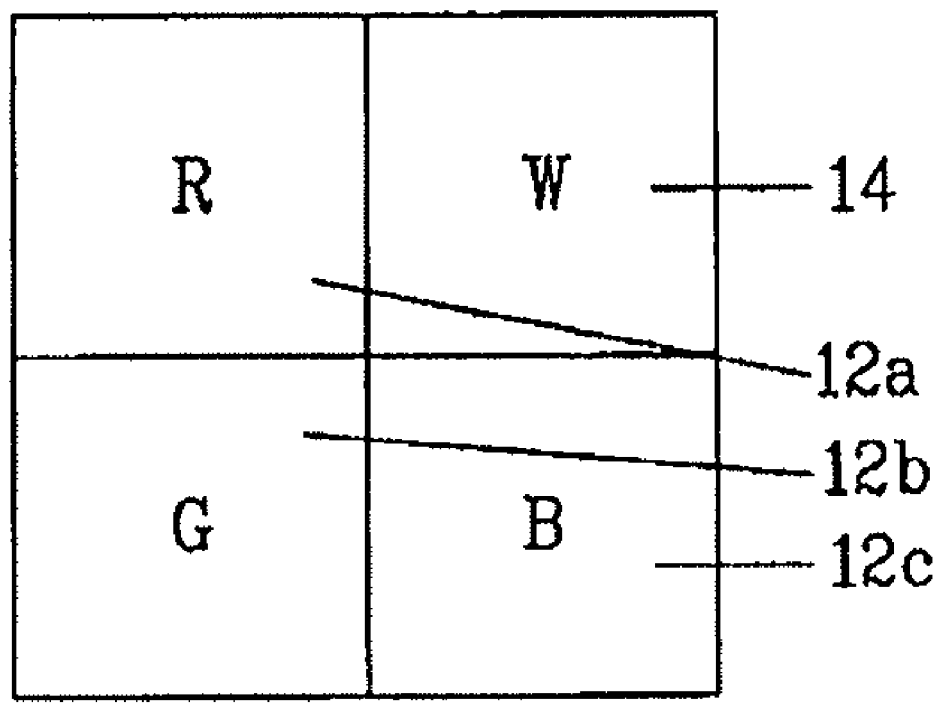
FIG. 1 is a pictorial representation of a quad-type single pixel having a white sub-pixel.
Figure 2A:
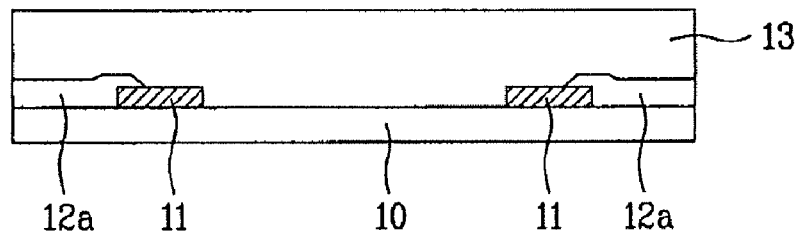
FIGS. 2A to 2C show cross sectional views illustrating a method of manufacturing a color filter array substrate of a quad-type pixel structure.
Figure 2B:
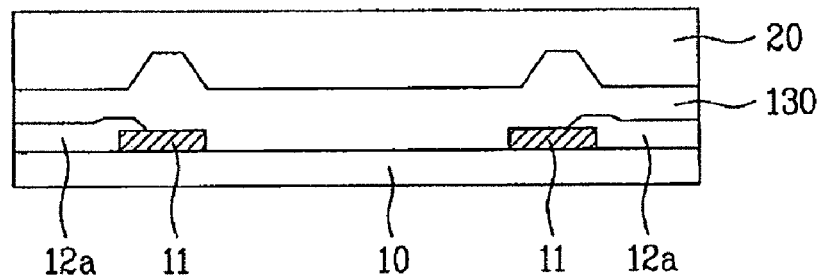
Figure 2C:
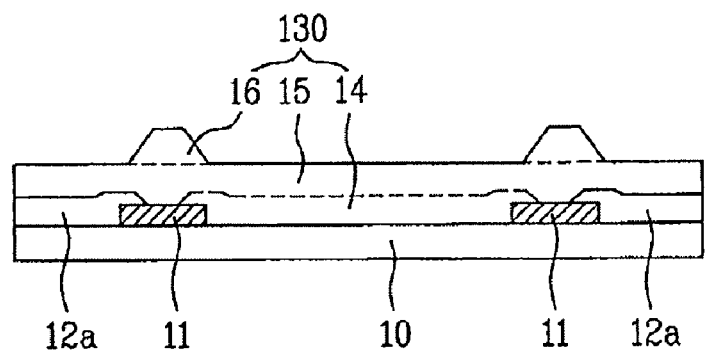
Figure 3:
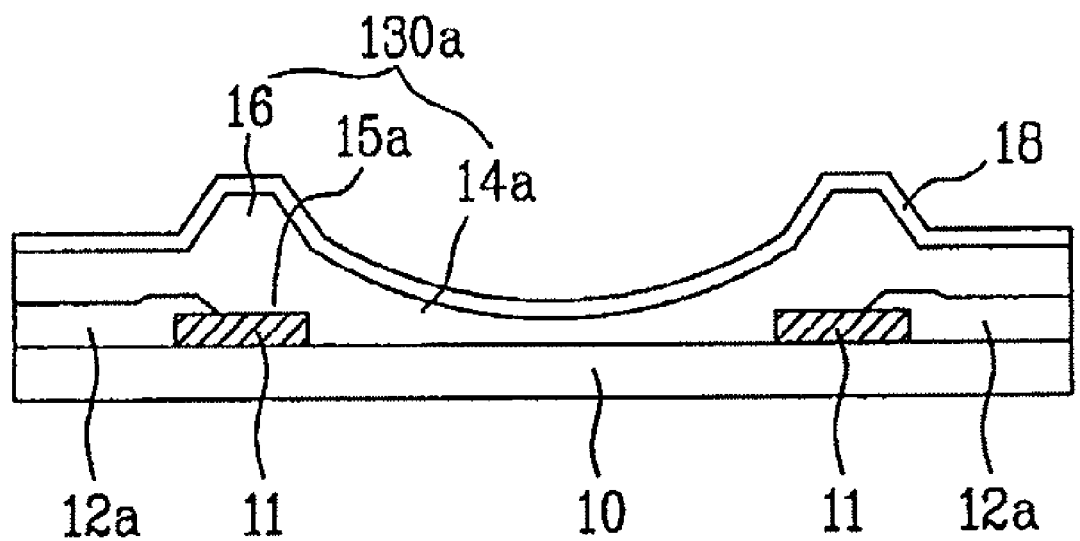
FIG. 3 shows a cross sectional view illustrating shrinkage in a color filter array after baking an alignment layer.

As shown in FIG. 4C, if additional heat treatment is applied, the pattern layer 52 is formed such that the distance between the linear chain structures is sharply decreased, whereby the entire contraction occurs in the pattern layer 52. When arranging the plurality of linear chain structures horizontally, there is the fixed distance between the linear chain structures after the curing process. As additional heat treatments are applied thereto, the distance between the linear chain structures decreases resulting in the contraction of pattern layer 52a. Accordingly, the pattern layer 52a, of which UV curable pre-polymer including the monomer of mono-functional group is cured, is contracted so that the volume of pattern layer cured is small relative to the initially coated pattern layer, which is shown in FIG. 3. In general, the linear chain structures formed in the curing process are stacked as multiple layers, whereby the thickness of pattern layer is greatly contracted.

To overcome the severe contraction of UV curable liquid pre-polymer due to the additional heat treatments after the curing process, it is necessary for the UV curable liquid pre-polymer to include the polymer having a di-functional group or tri-functional group based on the assumption that the UV curable liquid pre-polymer including the mono-functional group is contracted due to its structural properties during the curing process. If the UV curable liquid pre-polymer includes the polymer of di-functional group or tri-functional group, the volume of UV curable liquid pre-polymer remains constant, even when cured and heat-treated.

Figure 5A:
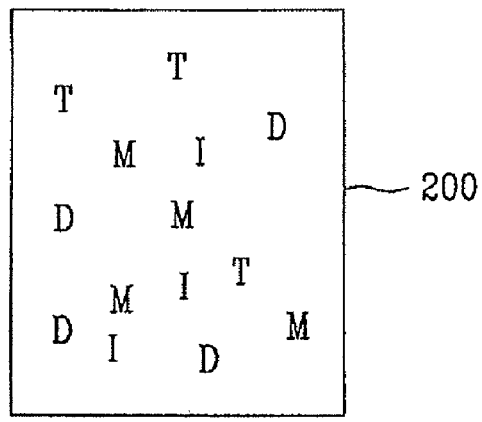
FIGS. 5A to 5C show a volume change in a UV curable liquid pre-polymer of functional group including branch or cross-linking after a curing process and a heat treatment.
Figure 5B:
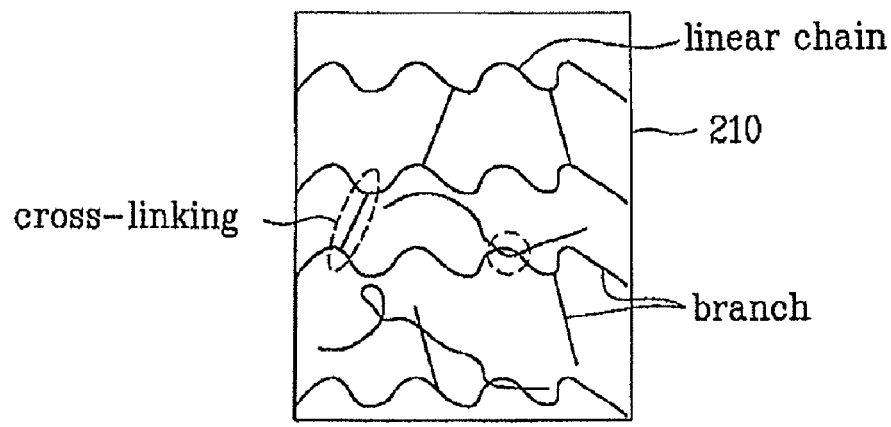
Figure 5C:
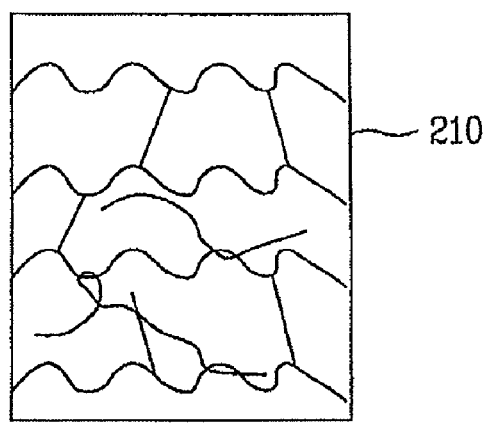

FIGS. 5A to 5C show the volume change in the UV curable liquid pre-polymer of the functional group including branch or cross-linking after the curing process and the heat treatment. As shown in FIG. 5A, the UV curable liquid pre-polymer includes a mono-functional monomer (M) of about 30~60% by volume, a di-functional monomer (D) of about 20~50% by volume, a tri-functional monomer (T) of about 10~20% by volume, and a photo-initiator (I). The mono-functional monomer (M) is formed of $CH_2=CHY$ or $CH_2=CXY$, wherein 'X' and 'Y' are formed of any one of halogen, alkyl, ester or phenyl. The mono-functional monomer (M) is generally formed of a vinyl monomer, which is formed in a carbon covalent bond structure.

The di-functional monomer (D) is formed of HDDA (1,6-hexanediol diacrylate) or DGDMA (Diethylene Glycol Dimethacrylate). For example, the di-functional monomer (D) has the following chemical formula 1.

[chemical formula 1]

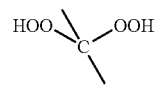

2,2-dihydroperoxypropane

Also, the tri-functional monomer (T) is formed of 1-(tetrahydro-methylenefuran-2-yl)vinyl acrylate or 3-(2-oxooxazolidin-3-yl)buta-1,3-dien-2-yl acrylate. For example, the tri-functional monomer (T) has the following chemical formulas 2 and 3.

[chemical formula 2]

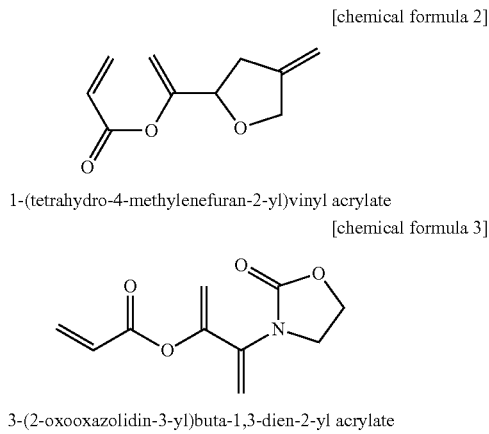

1-(tetrahydro-4-methylenefuran-2-yl)vinyl acrylate

[chemical formula 3]

3-(2-oxooxazolidin-3-yl)buta-1,3-dien-2-yl acrylate

The photo-initiator (I) is included at about 1~3% by weight of the total weight including the mono-functional monomer (M), the di-functional monomer (D) and the tri-functional monomer (T). The photo-initiator (I) is formed of any one of Irgacure 369{2-benzyl-2-(dimethylamino)-1-[4-(morpholinyl)phenyl]-1-butanone}, Irgacure 819{phenyl bis(2,4,6-trimethyl benzoyl)} or Irgacure 184{1-hydtoxycyclohexyl phenyl ketone}.

The photo-initiator (I) is provided at about 1~3% by weight, wherein the photo-initiator (I) is an aromatic ketone based material or phosphine oxide based material. For example, Irgacure 819 is the phosphine oxide based material, and Irgacure 184 and Irgacure 369 are the aromatic ketone based materials, which may be substituted by the same-based material.

The photo-initiator (I) is a single active site generation initiator. However, the photo-initiator (I) may be replaced by a dual active site generation initiator so as to obtain the branch or cross-linking structure. To prevent a lowering of the response speed, the UV curable liquid pre-polymer may include both the photo-initiator including the dual active site, the photo-initiator including the single active site, any one of Irgacure 369{2-benzyl-2-(dimethylamino)-1-[4-(morpholinyl)phenyl]-1-butanone}, Irgacure 819{phenyl bis(2,4,6-trimethyl benzoyl)} and Irgacure 184{1-hydtoxycyclohexyl phenyl ketone}.

After coating the UV curable liquid pre-polymer 200 as the thin film on the substrate (not shown), UV light is applied to the UV curable liquid pre-polymer. Thus, the monomers and photo-initiators randomly arranged in the UV curable liquid pre-polymer are activated so that the mono-functional monomer (M), the di-functional monomer (D) and the tri-functional monomer (T) are combined in one line, thereby forming linear chain structures. With respect to the di-functional monomer (D) or tri-functional monomer (T) combined with the mono-functional monomer (M), the non-combined functional group serves as the branch. Further, the branches formed from the separate linear chains are connected to the adjacent linear structure, thereby forming the cross-linking structure. After curing the UV curable liquid pre-polymer, the pattern layer 210 becomes more solid and thus more stable.

Accordingly, as shown in FIG. 5C, even though the additional heat treatment is applied after forming the pattern layer 210 by curing, the cross-linking portion between the adjacent linear chains helps to maintain the gap between the adjacent linear chains. On the portion having no crossing-linking in the adjacent linear chains, the branch supports the gap between the adjacent linear chains. As a result, the volume of pattern layer 210 remains substantially constant. Especially, for the structure of pattern layer 210 where the linear chains are piled in sequence, it is possible to minimize the change of thickness by the cross-linking and branch.

The UV curable liquid pre-polymer includes the mono-functional monomer (M) of about 30~60% by volume, the di-functional monomer (D) of about 20~50% by volume, and the tri-functional monomer (T) of about 10~20% by volume for the following reasons. As the number of functional groups increases, the number of cross-linking and branch also increases by activation of the functional group. Through the additional heat treatment after the curing process, the contraction of UV curable liquid pre-polymer is minimized. However, by increasing the number of functional groups, the viscosity also increases. Thus, when forming the pattern by providing the mold structure, for example, a soft mold applied to the substrate after coating the substrate with the UV curable liquid pre-polymer, the mobility and the response speed are lowered wherein it is difficult to obtain the desired pattern on the substrate. Accordingly, the increase in viscosity of UV curable liquid pre-polymer is limited to a maximum value. Providing the tri-functional monomer above about 20% by volume of the UV curable liquid pre-polymer renders forming the desired pattern impossible.

To limit the increase in viscosity, the UV curable liquid pre-polymer may include the di-functional monomer as well as the tri-functional monomer, to secure thermal stability. The di-functional monomer and tri-functional monomer help to generate the branch and cross-linking by the activation of UV light. Use of the di-functional monomer and tri-functional monomer as well as the mono-functional monomer provides greater thermal stability than use of only the mono-function monomer.

When using only the di-functional monomer and tri-functional monomer, the response speed to activate the respective monomers using UV radiation is lowered due to the large number of functional groups. In this respect, the UV curable liquid pre-polymer necessarily requires the mono-functional monomer. By providing the mono-functional monomer between about 30% by volume and about 60% by volume, it is possible to improve the response speed and to obtain the appropriate viscosity.

The UV curable liquid pre-polymer is used in the pattern formation according to the following steps. First, a mold structure is prepared such that the rear surface of mold structure is provided with a backplane and concave and convex portions are provided on the rear surface thereof.

Opposite the mold structure, the substrate is coated with the above-mentioned UV curable liquid pre-polymer. Then, the mold structure is brought into contact with the UV curable liquid pre-polymer, and is then cured, so that predetermined patterns corresponding to the concave and convex portions of mold structure are formed in the surface of UV curable liquid pre-polymer. Thereafter, the mold structure is separated from the predetermined patterns of UV curable liquid pre-polymer.

As explained above, the UV curable liquid pre-polymer may be applicable to the non-exposure process as well as the process for the mold structure. For example, after coating the substrate with the UV curable liquid pre-polymer, the predetermined patterns may be formed in the UV curable liquid pre-polymer by printing.

As shown in FIG. 5A, when the UV curable liquid pre-polymer is used in an LCD device having a white-plus structure, both a white color filter layer and an overcoat layer can be simultaneously formed by the UV curable liquid pre-polymer. Furthermore, a column spacer as well as the white color filter layer and the overcoat layer can be formed by the UV curable liquid pre-polymer.

Figure 6:
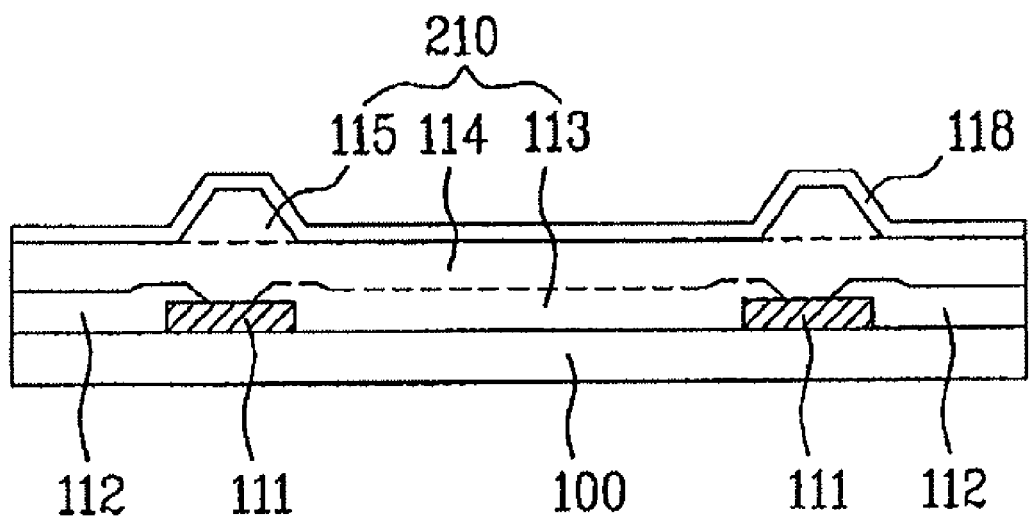
FIG. 6 shows a cross sectional view of illustrating an LCD device using a UV curable liquid pre-polymer.

FIG. 6 shows a cross sectional view illustrating an LCD device using the UV curable liquid pre-polymer. As shown in FIG. 6, the LCD device includes the UV curable liquid pre-polymer, which functions as the pattern layer. The LCD device includes a first substrate 100 and a second substrate (not shown), which face each other, and a liquid crystal layer formed between the first and second substrates, wherein the first substrate 100 includes red, green, blue and white sub-pixels arranged regularly.

Also, the first substrate 100 includes a light-shielding layer 111, which is formed in other portions except the sub-pixels. Red, green and blue color filter layers 112 are provided in the respective red, green and blue sub-pixels, and a planarized pattern layer 210 is formed on an entire surface including the light-shielding layer 111 and the red, green and blue color filter layers 112. The planarized pattern layer 210 is formed of the above-mentioned UV curable liquid pre-polymer.

The planarized pattern layer 210 is formed by applying a coating of the UV curable liquid pre-polymer including the mono-functional monomer (M) of about 30~60% by volume, the di-functional monomer (D) of about 20~50% by volume, and the tri-functional monomer (T) of about 10~20% by volume. According as the planarized pattern layer 210 is formed above the red, green, blue and white sub-pixels, the planarized pattern layer 210 functions as the white color filter layer 113 in the white sub pixel, and also functions as the planarization layer 114 in the other regions. As shown in the drawings, the planarized pattern layer 210 is provided with projected portions above the light-shielding layer 111, so that the planarized pattern layer 210 may function as the column spacer 115.

The column spacer 115 and the planarized pattern layer 210 may be formed in different steps. In this case, the planarized pattern layer is formed flat on the entire surface of substrate except the region of the column spacer. As shown in the drawings, the plurality of layers are formed together by the planarized pattern layer 210, so that it is possible to decrease the number of steps for the first substrate 100.

A second substrate have a thin film transistor array is prepared opposite the first substrate having the color filter array. The thin film transistor array includes gate and data lines, which cross each other at the boundaries of each sub-pixels, a thin film transistor adjacent to the crossing of gate and data lines, and a pixel electrode formed in each sub-pixel. The pixel electrode may alternate with the pixel electrode in each sub-pixel. Then, a first alignment layer 118 is formed on the entire surface of first substrate 100 including the planarized pattern layer 210, and a second alignment layer (not shown) may be formed on the entire surface of second substrate including the thin film transistor array.

In FIG. 6, after forming the alignment layers, the planarized pattern layer 210 has flat upper surfaces corresponding to the red, green, blue and white sub-pixels. By forming the planarized pattern layer 210, it is possible to provide the white color filter layer 113 corresponding to the white sub-pixel, and the overcoat layer 114 to planarize the first substrate 100 including the light-shielding layer 111. After curing the planarized pattern layer 210, the cross linkage and closeness improve in the planarized pattern layer 210. Thus, the planarized pattern layer 210 maintains its volume without substantial shrinkage due to its the high thermal stability. Even though the additional heat treatment is applied to form the alignment layer 118 after forming the planarized pattern layer 210, the portion corresponding to the white sub-pixel is not recessed or shrunk, so that the planarized pattern layer 210 maintains a uniform thickness.

Next, the liquid crystal layer is formed between the first substrate 100 including the color filter array and the second substrate (not shown) including the thin film transistor array. To form the liquid crystal layer, a sealant having no inlet is formed on either of the first and second substrates, and liquid crystal material is applied to the substrate having the sealant. The first and second substrates are then bonded to each other. In another method, a sealant having an inlet is formed on either of the first and second substrates, and the first and second substrates are bonded to each other. The liquid crystal material is injected to the space between the first and second substrates through the inlet by using capillary phenomenon and pressure difference.

As mentioned above, the UV curable liquid pre-polymer and the LCD device using the UV curable liquid pre-polymer have the following advantages. First, it is possible to prevent the predetermined portion of pattern from shrinking due to the heat treatment. Second, the UV curable liquid pre-polymer may be used to form the white color filter layer, the overcoat layer and the column spacer together where the UV curable liquid pre-polymer includes the di-functional monomer and tri-functional monomer and mono-functional monomer at the predetermined ratios. Thus, even though the heat treatment is applied after forming the pattern using the UV curable liquid pre-polymer, it is possible to prevent the UV curable liquid pre-polymer having the branch or cross-linking structure from shrinking or decreasing in volume, thereby realizing the UV curable liquid pre-polymer having the heat-resistance. Use of the UV curable liquid pre-polymer prevents the white sub-pixel portion from shrinking or from being recessed, thereby providing a high quality picture device and preventing a defective cell gap.

It will be apparent to those skilled in the art that various modifications and variations can be made in the embodiments of the present invention without departing from the spirit or scope of the invention. Thus, it is intended that the present invention covers the modifications and variations of the embodiments provided they come within the scope of the appended claims and their equivalents.

What is claimed is:

1. An UV curable liquid pre-polymer comprising a mono-functional monomer, a di-functional monomer, a tri-functional monomer and a photo-initiator,
   wherein the mono-functional monomer, the di-funtional monomer and the tri-functional monomer are included at 30~60%, 20~50% and of 10~20% in a total volume of the UV curable liquid pre-polymer.

2. The UV curable liquid pre-polymer of claim 1, wherein the photo-initiator includes an active site to induce an initial reaction on the mono-functional monomers.

3. The UV curable liquid pre-polymer of claim 1, wherein the mono-functional monomer is $CH_2\!=\!CHY$ or $CH_2\!=\!CXY$, wherein the substituents "X" and "Y" are independently selected from halogen, alkyl, ester and phenyl.

4. The UV curable liquid pre-polymer of claim 1, wherein the mono-functional monomer is selected from a vinyl monomer.

5. The UV curable liquid pre-polymer of claim 1, wherein the di-functional monomer is HDDA(1,6-hexanediol diacrylate) or DGDMA(Diethylene Glycol Dimethacrylate).

6. The UV curable liquid pre-polymer of claim 1, wherein the tri-functional monomer is 1-(tetrahydro-methylenefuran-2-yl)vinyl acrylate or 3-(2-oxooxazolidin-3-yl)buta-1,3-dien-2-yl acrylate.

7. The UV curable liquid pre-polymer of claim 1, wherein the photo-initiator is included at 1~3% of a total weight including the mono-functional monomer, the di-functional monomer and the tri-functional monomer.

8. The UV curable liquid pre-polymer of claim 7, wherein the photo-initiator is formed of any one of 2-benzyl-2-(dimethylamino)-1-[4-(morpholinyl)phenyl]-1-butanone, phenyl bis(2,4,6-trimethyl benzoyl) or 1-hydtoxycyclohexyl phenyl ketone.

9. The UV curable liquid pre-polymer of claim 1, wherein the photo-initiator includes a dual active site generation initiator.

* * * * *